Oct. 14, 1941.   J. L. RUTH   2,259,269
UNIVERSAL NUT
Filed May 14, 1940   2 Sheets-Sheet 1
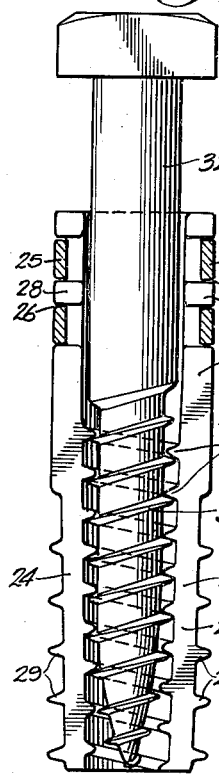
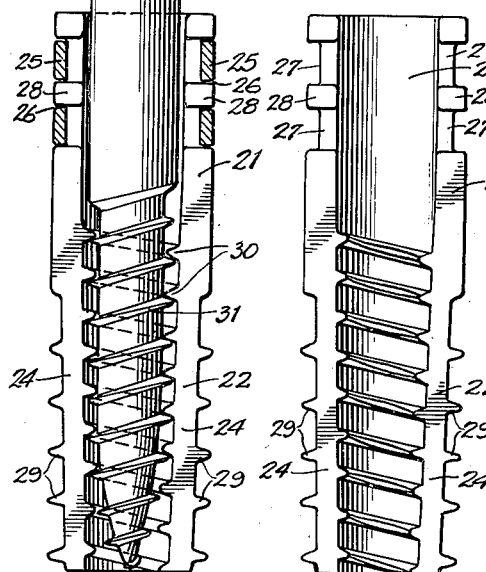
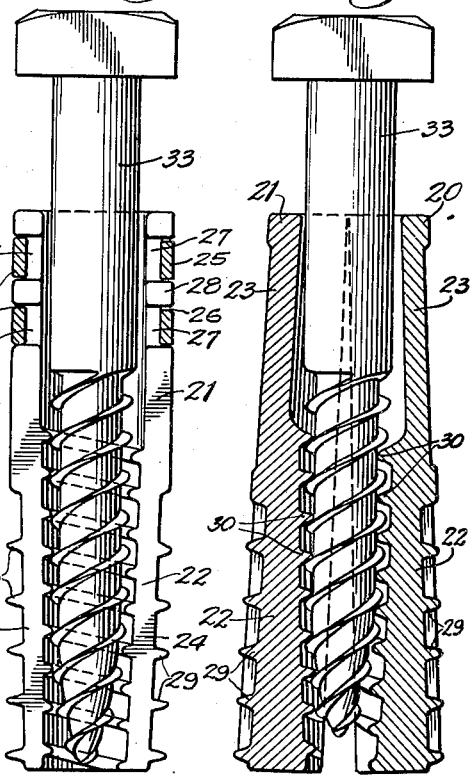
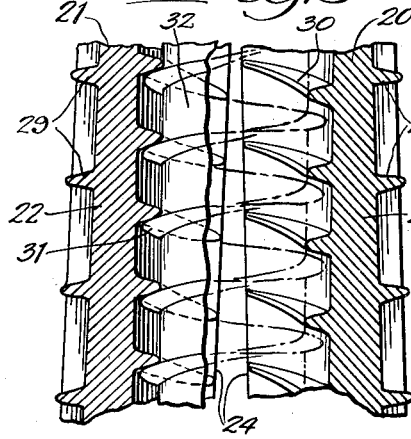
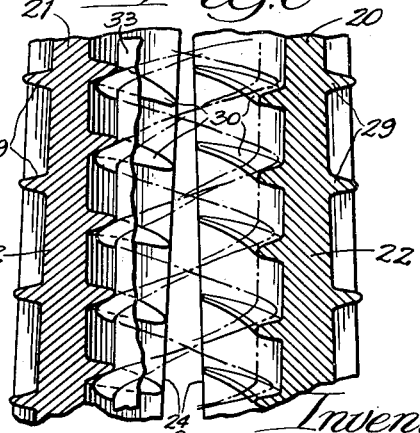
Inventor:
John L. Ruth,
By Cumming & Cumming
Attorneys.

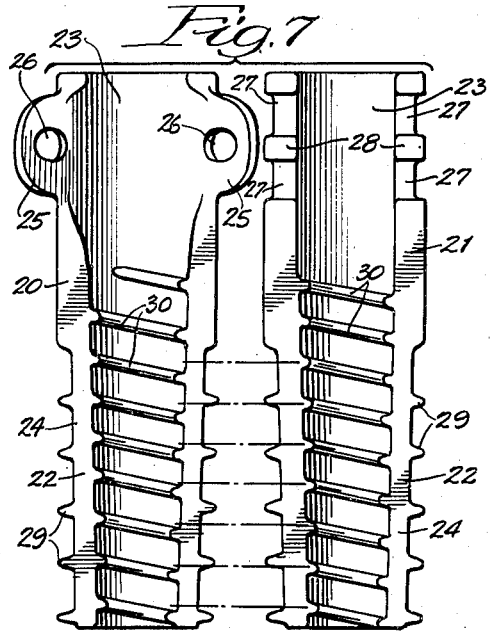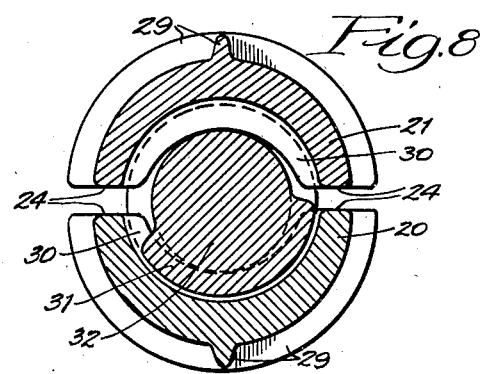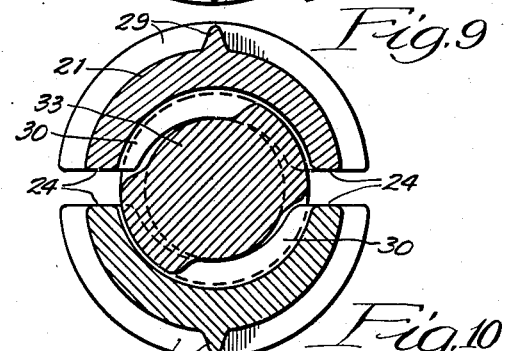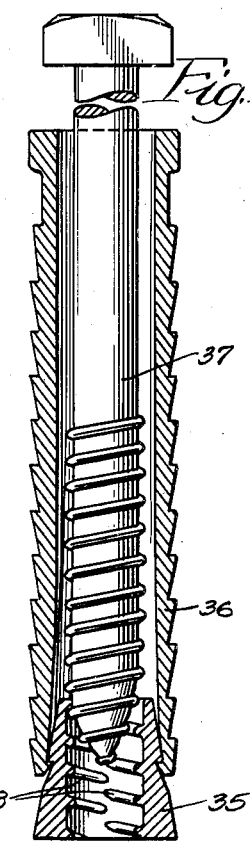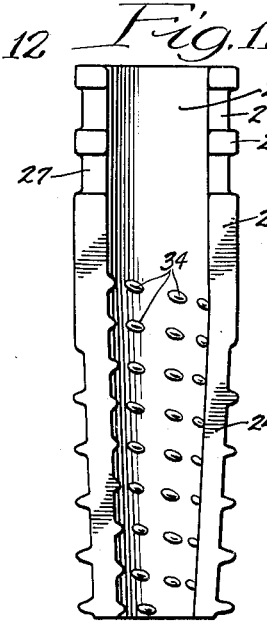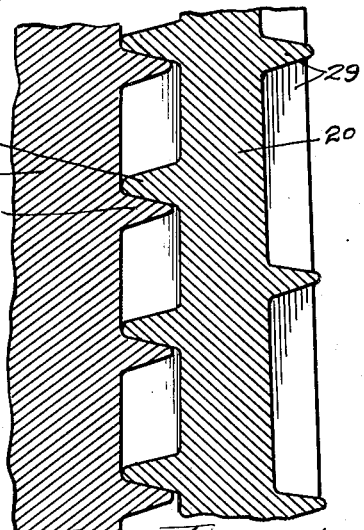

Patented Oct. 14, 1941

2,259,269

UNITED STATES PATENT OFFICE 2,259,269

UNIVERSAL NUT

John L. Ruth, York, Pa.

Application May 14, 1940, Serial No. 335,105

3 Claims. (Cl. 85—2.4)

The improvements herein disclosed are directed to a universal nut adapted to accommodate and coact with bolts having either single or multiple screw threads which are relatively large and coarse. An example of such a bolt is the familiar lag screw now made with single, double or even triple threads.

By way of exemplification, one of the nuts herein described and illustrated is in the form of an expansion shield, which as now constructed usually comprises two coacting sections which may be of malleable iron and formed internally with complementary threads intended to coact with a lag bolt which, while advancing axially between the shield sections, produces a lateral distension of the shield.

It has been common practice in the past to provide shields which are specially threaded on the interior to coact with lag bolts having correspondingly formed threads of the same character, so that it becomes necessary to employ a shield and lag bolt of complementary character. Such complementary members may be provided either with single or multiple threads, but in use it is necessary to assemble a shield and bolt of the same type, inasmuch as any other combination will fail in operation.

The purpose of the present invention is to provide a nut such as a shield or the like which is capable of cooperating equally with bolts having single or multiple threads or with bolts having single threads of different pitch, so that the same shield is adaptable for use without change under varying conditions. This is important, since bolts are now commercially produced according to certain approved standards, so that by providing a shield embodying the features of the present invention the same may be used with standard bolts of varying character for providing anchorage in fixed bodies such as masonry, concrete, or the like.

This result is attained by providing the shield members with interior threads disposed at what may be termed a normal helix angle to coact with single threaded bolts of corresponding pitch, but with the further capability of affording gaps in the continuity of the threading, which will permit the use of bolts having twin threads of twice the normal helix angle of the shield threads, or bolts having single threads of twice the normal helix angle, or even triple threaded bolts.

This result is attained without undue sacrifice in the area of engagement between the threads of the bolt and shield, or other type of nut embodying the principles of the present invention, as will appear from a detailed description of the invention in conjunction with the accompanying drawings, wherein—

Figure 1 is a view mainly in elevation, showing the interior of one section of the shield of the present invention with a single threaded lag bolt in cooperative relation therewith;

Fig. 2 is a similar view showing the bolt omitted;

Fig. 3 is a view similar to that of Fig. 1, showing the shield in coacting relation with a twin threaded bolt;

Fig. 4 is a view in section through the two shield sections, showing the same being expanded by a twin threaded bolt;

Fig. 5 is an enlarged fragmentary sectional view illustrating the manner in which a single threaded bolt engages the threads of the two shield sections;

Fig. 6 is a similar view showing the manner of engagement of a twin threaded bolt with the same shield sections;

Fig. 7 is a face view showing the interior of two shield sections in open relation to one another to indicate the staggered relation of the threading;

Fig. 8 is an enlarged cross sectional view showing the relation of the threads where a single threaded bolt is employed;

Fig. 9 is a similar view showing the relation of the threads where a twin threaded bolt is employed;

Fig. 10 is an enlarged fragmentary sectional detail showing the relation of the threads of a twin threaded bolt with one of the shield sections;

Fig. 11 is a view showing a modified type of threads for the expansion shield; and Fig. 12 is a sectional view showing the principles of the present invention embodied in an integral expansion nut adapted to be drawn inwardly into the expansion shield to effect distension thereof.

In order to clearly understand the principles of the present invention, it is deemed desirable to give a definition of the terms employed, as follows:

(a) *Helix.*—The curve formed on any cylinder, especially a right hand thread on a circular cylinder, by a right hand thread line in a plane that is wrapped around the cylinder in the manner of an ordinary screw thread.

(b) *Helix angle.*—The angle made by the helix of the thread at the pitch diameter with a plane normal to the axis.

(c) *Axis.*—The longitudinal center line through the screw or nut.

(d) *Lead.*—The distance a thread or helix advances axially in one complete turn or revolution.

(e) *Pitch.*—The distance from a point on a thread or helix to a corresponding point on the next thread or helix measured parallel to the axis.

*Note:* "Pitch" should not be confused with "lead," as in a single thread the lead and pitch are identical while on a multiple thread the lead is that multiple of the pitch, as for example a triple thread has a lead equivalent to three times the pitch.

Referring now to the exemplification of the invention shown in Figs. 1 to 10 inclusive, the universal nut employed is in the form of an expansion shield consisting of two sections 20 and 21, which sections are of generally cylindrical formation, as is common in the construction of such devices, and conform to standard practice save for the threading on the interior which embodies the principles of the present invention.

Each section comprises a tubular shell 22 of slightly tapering formation in an axial direction, and of substantially circular cross section. The shell walls, however, progressively increase in thickness in the plane intermediate the meeting edges, so that the bore progressively diminishes in width in this direction which provides for the distension of the shield sections when the bolt is secured into place.

The upper or head end of the section 20 is provided with a pair of ears 25 each having an aperture 26, which ears register with grooves 27 separated by intermediate lugs 28 in the companion shell, which arrangement permits the ears 25 to be bent around the head of the companion section to hold the parts in close relation at the upper end, while permitting the lower ends to be spread or distended away from one another to produce the desired expansion. In the particulars above described, the device follows standard practice, including the provision of exterior circumferential ribs or ridges 29.

The interior threading of the sections, however, is peculiar in that when the two sections are assembled in opposed relation to one another, the thread sections do not register with one another, so that the combined interior threading is discontinuous, thereby affording recurrent gaps for the switching over or escape of the threads of a bolt, as for instance a twin threaded bolt, in which the lead of the individual bolt threads is greater than the lead of the threads of the shield. The clearance space between the shield threads also is especially computed to conform to the requirements of such a principle of operation.

In the present exemplification of the invention, the interior threads 30 of the companion sections are formed with a helix angle equal to that of a single threaded lag bolt having a corresponding lead and pitch, but the thread portions on the companion shield sections are so disposed that, when the two shield sections are united in opposed relation to one another, the contiguous ends of the thread portions will stand in staggered relation to one another, as indicated in Fig. 7, so that the progression of the threading throughout the shield will be discontinuous, thereby affording gaps in the threading for the passage of the threads of a bolt having a lead which is a multiple of the lead of the shield threads.

Also the spacing of the thread portions on the shield sections is enlarged sufficiently to permit bolt threads of greater lead to traverse the space between the shield threads without binding or cramping in order to escape through the gaps afforded by reason of the staggered relation of the thread portions of the shield sections.

Fig. 1 shows how the threads 31 of a single threaded lag bolt 32 engage the under faces of the thread portions on the section 21 of the shield. It will be noted that the thread engagement is continuous throughout this shield section, but by reference to Fig. 5, which shows both of the shield sections in their relation to the same bolt, it will be noted that the bolt threads are out of engagement with the thread portions on the latter section by reason of the staggered relation of the threading. However, the thread engagement afforded throughout half the shield is sufficient to afford the resistance necessary to advance the bolt in the manner required in expanding the shield sections to afford the necessary grip against the surrounding masonry or other structure into which the shield is inserted.

Referring to Fig. 3, we see the same shield section in coacting relation with a twin threaded lag bolt 33, in which the pitch is the same as that of the bolt first described but having a lead which is twice that of the threads of the shield. In this case, the bolt threads will have point contact with the under surfaces of the shield thread but will elsewhere progress out of contact therewith and escape through the gaps afforded by the staggered relation of the threading of the shield sections.

Figs. 4 and 6 illustrate the relationship of the bolt threading to the threads of the two sections, and it will be observed that the space between the threads of the shield sections is much greater than the thickness of the threads of the bolt, so that sufficient clearance is provided to permit the bolt threads to continue their spiral advance without binding or cramping.

It will of course be understood that the only effective engagement between the bolt threads and the threads of the shield sections is that afforded by the upper faces of the bolt threads engaging the lower faces of the shield threads, but demonstration has shown that even with the point engagement afforded in the case of a twin threaded bolt, sufficient resistance is afforded by the shield threads to insure the advance of the bolt required in expanding the shield, and also to afford adequate resistance to the lengthwise withdrawal of the bolt under the pull of a heavy load.

Although the threaded engagement is interrupted, it will be noted particularly from Figs. 4, 5 and 6 that the inner edges of the shield threads maintain contact with the root of the bolt throughout, which is the contact required in expanding the shield, since the thread engagement between shield and bolt is utilized primarily for advancing the bolt rather than for directly expanding the shield. It will also be noted from Fig. 4 that the shield walls are thicker within the axial plane which intersects the centers of the shield sections than at the margins of the shield sections, so that before expansion the bore through the shield will progress from a substantially cylindrical configuration near the upper end to a flattened or ovate form at the lower end, but as the bolt is advanced as in Fig. 4, the shield may be expanded at its lower or free end sufficiently to assume the formation of a truncated cone, which is highly desirable where the shield is intended for use in an undercut bore in masonry or the like. This feature, however, is not special to the present invention, but is rather in conformity with the standard practice in the construction of expansion shields.

Fig. 8 illustrates a single threaded lag bolt whose thread (of equal pitch and lead with the shield threads) passes from under the shield thread portion of the upper section there shown, and over the thread of the lower shield section by reason of the staggered relation of the threading.

Fig. 9 is a similar illustration, showing cooperation of the threads of a twin threaded bolt and indicating the points of escape for the bolt threads afforded by the staggered of the shield threads, which ease of escape is furthered by the widening of the gap between the shield sections as the same are expanded by the advance of the bolt.

It is not essential that the threading of the shield sections be continuous, since similar results may be attained by the type of threading shown in Fig. 11, in which each shield section is provided with rows of bosses 34 having a helical line of spacing similar to that employed in threading of the character first described, and with the bosses contacting the root of the bolt.

Fig. 12 illustrates the principles of the present invention as applied to an expansion nut 35 of truncated conical formation, and employed in conjunction with an expansion shield 36 and a single threaded bolt 37. In this case the nut is provided on its interior with two sets of thread portions 38 which extend about half way around the bore of the nut and terminate in staggered relation to one another to afford the gaps required for the escape of the bolt threads where a twin threaded bolt is employed, or a single threaded bolt having a lead which is a multiple of the lead of the nut threads. In the case of Fig. 12, the shell is expanded by the pull of the bolt in drawing the nut back into the end of the shell.

Although in the exemplifications of the invention here shown the required gaps are obtained by the staggering of the threads on the interior of the expansion shield sections, it is not the intention to limit the invention to the staggered relation here shown, since the essential requirement is that of providing gaps for the escape or switching over of bolt threads of greater lead than the threads of the shield, and the arrangement of such gaps may be otherwise afforded, it being essential, however, that provision be made for insuring sufficient thread engagement between the shell sections and bolts of varying lead to afford the contact required in advancing the bolt and without the necessity for attempting to provide two sets of threads of different leads intersecting one another to accommodate bolts of different types.

Although the invention has been particularly described as applicable to expansion nuts or shields, it will be understood that the principles herein set forth are applicable to nuts intended for other purposes, unless otherwise indicated in the claims.

I claim:

1. A nut having on its interior a single female thread of substantially uniform size and pitch from one end of the nut to the other, said female thread being divided longitudinally of the nut into separate sets of thread portions and having its continuity broken and said sets of thread portions being offset axially of the nut thereby forming open spaces or gaps to permits male threads of a screw fastener of the same and of greater leads to pass through the gaps or open spaces while making recurrent screw contact with one set of the thread portions.

2. A nut in the form of an expansion shell comprising a plurality of sections and having on its interior a single female thread of substantially uniform size and pitch from one end of the nut to the other, said nut being divided longitudinally of the nut into separate sets of thread portions and having its continuity broken and said sets of thread portions being offset axially of the nut thereby forming open spaces or gaps to permit male threads of a screw fastener of the same and of greater leads to pass through the gaps or open spaces while making recurrent screw contact with one set of the thread portions.

3. An exteriorly tapered nut adapted to expand a sectional shell and provided on its interior with a single female thread of uniform size and pitch, said thread being divided longitudinally of the nut into separate sets of thread portions and having its continuity broken and said sets of thread portions offset axially of the nut from each other thereby forming open spaces or gaps to permit male threads of a screw fastener of the same and of greater leads to pass through the gaps or open spaces while making recurrent screw contact with one set of the thread portions.

JOHN L. RUTH.